US008690225B2

(12) United States Patent
Ginn et al.

(10) Patent No.: US 8,690,225 B2

(45) Date of Patent: Apr. 8, 2014

(54) ACTUATION MECHANISM FOR A SLIDING DOOR OF A MOTOR VEHICLE

(75) Inventors: David Maurice Ginn, Shoeburyness (GB); Rob Anthony Richardson, Chelmsford (GB); Heath Sidney Sargeant, Upminster (GB)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 13/541,901

(22) Filed: Jul. 5, 2012

(65) Prior Publication Data

US 2013/0014442 A1 Jan. 17, 2013

(30) Foreign Application Priority Data

Jul. 11, 2011 (GB) .................................. 1111852.8

(51) Int. Cl.
*B60J 5/04* (2006.01)

(52) U.S. Cl.
USPC ........................................ 296/155; 296/146.4

(58) Field of Classification Search
USPC .......... 296/155, 146.4, 146.9; 74/89.2, 89.22; 49/360
See application file for complete search history.

(56) References Cited

U.S. PATENT DOCUMENTS

| | | | | |
|---|---|---|---|---|
| 6,321,488 | B1 | 11/2001 | Bigoszewski et al. | |
| 7,575,270 | B2 * | 8/2009 | Nagai et al. | 296/155 |
| 7,856,759 | B2 | 12/2010 | Elliott et al. | |
| 2008/0072498 | A1 | 3/2008 | Rogers et al. | |
| 2008/0302018 | A1 | 12/2008 | Yamada et al. | |
| 2010/0154313 | A1 | 6/2010 | Elliott et al. | |
| 2010/0180508 | A1 | 7/2010 | Yamaguchi et al. | |

FOREIGN PATENT DOCUMENTS

| | | | |
|---|---|---|---|
| EP | 1813759 | A1 | 8/2007 |
| EP | 2006134 | | 3/2011 |
| GB | 1111852.8 | | 7/2011 |
| KR | 2005120370 | A | 6/2004 |
| WO | WO2008025827 | | 6/2008 |
| WO | WO2008104080 | | 9/2008 |

* cited by examiner

*Primary Examiner* — Joseph Pape

(74) *Attorney, Agent, or Firm* — Raymond L. Coppiellie; Brooks Kushman P.C.

(57) ABSTRACT

A door actuation mechanism for a sliding door of a motor vehicle is disclosed as having a motor driven door actuator connected to first and second actuation cables used for opening and closing the door. Both of the actuation cables has a portion extending away from the door actuator in a direction in which the respective cable moves the door.

13 Claims, 6 Drawing Sheets

ACTUATION MECHANISM FOR A SLIDING DOOR OF A MOTOR VEHICLE

CROSS-REFERENCE TO RELATED APPLICATIONS

This application claims priority to Great Britain Patent Application No. GB 1111852.8 titled "An Actuation Mechanism for a Sliding Door of a Motor Vehicle" filed Jul. 11, 2011, which is hereby incorporated by reference in its entirety.

TECHNICAL FIELD

The present disclosure relates to a motor vehicle having a door opening mechanism for a sliding door.

BACKGROUND

Some contemporary vehicles provide a motor vehicle with a side door that is movable between closed and open positions by a sliding motion. For example, U.S. Pat. Nos. 6,321,488 and 7,856,759 teach mechanisms for effecting such opening and closing by electro-mechanical means. In these designs door opening and closing is effectuated through a drive train that includes small exposed gear wheels that can be expensive to produce and noisy in operation.

Other contemporary vehicles use pulley systems, such as WO 2008/104080 titled "Compact Cable Drive Power Sliding Door Mechanism." These systems anchor the pulleys to the vehicle and the cables to a hinge having forward and rearward cable terminals linked to the movable or sliding door itself. Thus, additional parts are required to anchor the cables. Springs and/or pretensioners are also used to bias the cable in order to facilitate movement. These unnecessary parts can be expensive to produce and noisy in operation as well.

Therefore, it is desirable to have a door actuation mechanism for a sliding door that overcomes the problems associated with the prior art.

SUMMARY

It is an object of this invention to provide a door actuation mechanism for a sliding door that overcomes the problems associated with the prior art.

According to a first aspect of the invention there is provided a door actuation mechanism for a sliding door of a motor vehicle wherein the mechanism comprises a motor configured to drive a door actuator, a first cable having a first and second end, the first end attached to the door actuator and adapted for attachment of the second end to a body structure so as to define a first cable run and a second cable having a third and fourth end, the third end attached to the door actuator and adapted for attachment of the fourth end to the body structure so as to define a second cable run. A portion of each cable run runs in a direction in which the door mechanism moves the sliding door.

One advantage of the present disclosure is that it can be used with most known manual sliding door configurations to convert them to a powered or electrical mechanical format. Very few modifications have to be made to the vehicle to adapt it from a manual sliding door vehicle to a powered or automated sliding door vehicle. In particular, the main operational components of the door actuating mechanism are mounted within the door and no modifications are required to the body structure apart from the provision of anchors for the first and second cables.

A further advantage of the present disclosure is that it is of a simple construction and can be manufactured in an economical manner.

Another advantage of the present disclosure is that it is quiet in operation and the major components are housed within the door cavity.

Yet one more advantage is that the first and second cables can easily be concealed from view so that they are not visible to a user of the motor vehicle.

The invention will now be described by way of example with reference to the accompanying drawings:

DETAILED DESCRIPTION

Figure 1:
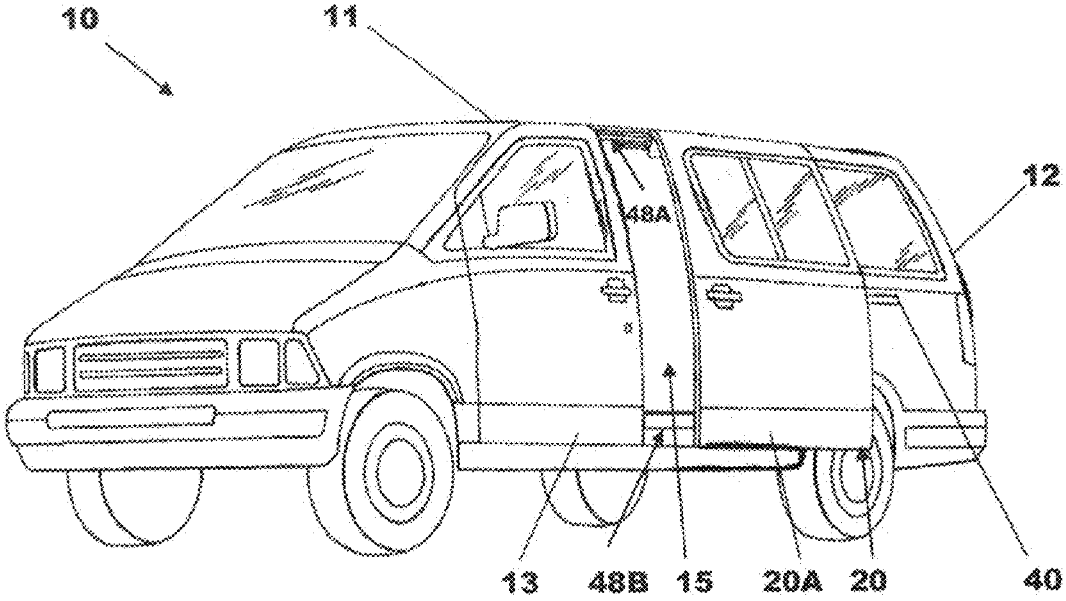
FIG. 1 is an illustration of a motor vehicle having a sliding door, according to an exemplary embodiment of the present disclosure, shown in a partially open position.

In the illustrated exemplary embodiment, there is provided a door actuation mechanism for a sliding door of a motor vehicle; the mechanism includes a motor configured to drive a door actuator, a first cable having a first and second end, the first end attached to the door actuator and adapted for attachment of the second end to a body structure so as to define a first cable run and a second cable having a third and fourth end, the third end attached to the door actuator and adapted for attachment of the fourth end to the body structure so as to define a second cable run. A portion of each cable run runs in a direction in which the door mechanism moves the sliding door.

The first cable can be used to move the door in a door opening direction and the second cable may be used to move the door in a door closing direction.

In one embodiment, the first cable run includes a first portion extending away from the door actuator to a first cable guide located near a first end of the door and a second portion extending from the first guide in the door opening direction for attachment to a part of the body structure of the motor vehicle, e.g., the C-post or C-pillar.

In the illustrated embodiment, the door is a rearward opening door, the first end of the door is a front end of the door and the first cable guide is located near the front end of the door.

The first cable guide can be located near to a bottom end of the door. The first cable can be guided for at least part of the first portion of the first cable run by a rigid tube having a bore coated in a low friction material.

In one embodiment, the second cable run includes a first portion extending away from the door actuator to a second cable guide located near a second end of the door and a second portion extending from the second guide in the door closing direction for attachment to a part of the body structure of the motor vehicle.

The second end of the door can be a rear end of the door and the second cable guide can be located near to the rear end of the door.

In the illustrated embodiment, rotation of the motor in a first direction causes the first cable to be retracted into the door actuator and the second cable to be reeled out from the door actuator so as to open the door and rotation of the motor in a second direction causes the second cable to be retracted into the door actuator and the first cable to be reeled out from the door actuator so as to close the door.

According to a another aspect of the present disclosure there is provided a sliding door for a motor vehicle with a door having an outer door panel and an inner door panel defining therebetween a door cavity and a door actuation mechanism.

The door can include a first guide arm attached at one end to the door for guiding the door during opening and closing of the door and a first cable guide attached near to a free end of the first guide arm. The door also comprises a second guide arm attached at one end of the door for guiding the door during opening and closing of the door, the second cable guide is attached near a free end of the second guide arm. At least when the door is in an open position, the second cable guide can be attached to the second guide arm so as to project into a guide channel attached to a side panel of the motor vehicle.

The second cable run includes a first portion extending away from the door actuator unit to the second cable guide and a second portion extending from the second guide in the door closing direction for attachment to part of the body structure of the motor vehicle and, at least when the door is in an open position, the second portion of the second cable run lies within the guide channel.

According to another aspect of the present disclosure there is provided a motor vehicle having at least one sliding door.

The motor vehicle can have a body structure having upper, lower, front and rear structural members defining a door aperture to be closed by a respective sliding door and the second ends of the first and second cables may both be attached to the respective one of the front and rear structural members defining the door aperture over which the door travels when moving between the closed and open positions.

The second ends of the first and second cables for the respective door can both be attached to the rear structural member defining the door aperture for the respective sliding door.

Figure 2:
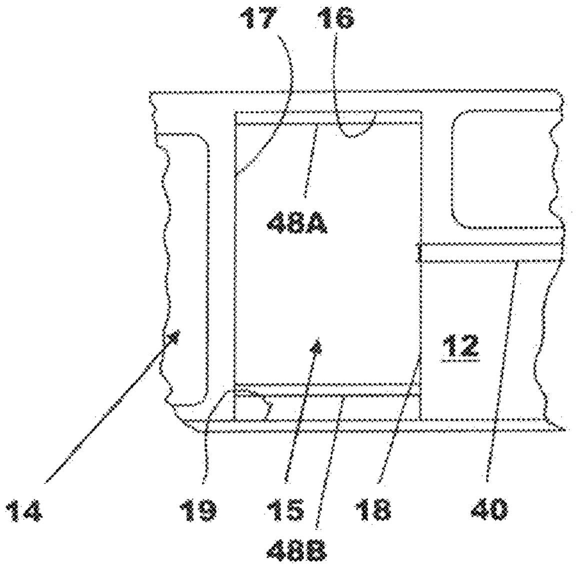
FIG. 2 is a side view of part of the motor vehicle shown in FIG. 1, showing a door aperture with the sliding door removed.

REFERRING NOW TO THE DRAWINGS, with particular reference to FIGS. 1 and 2 there is shown a motor vehicle 10 having a body structure 11 including a side panel 12. The motor vehicle 10 has a front door 13 which, when closed, overlies a front door aperture 14 and a second sliding door 20 which, when closed, overlies a second door aperture 15.

The second door aperture 15 is defined by various parts of the body structure 11 of the motor vehicle 10 in the form of an upper structural member 16, a front structural member in the form of a 'B' post 17, (or B-pillar) a rear structural member in the form of a 'C' post 18 (or C-pillar) and a lower structural member 19 which in combination define the door aperture 15 to be closed by the sliding door 20.

A guide channel 48 consists of an upper guide channel 48A, as shown in FIG. 2, attached to the body structure 11 at the top of the door aperture 15 by the upper structural member 16 and a lower guide channel 48B attached to the body structure 11 at the bottom of the door aperture 15 by the lower structural member 19. A centre or mid-guide channel 40 is attached to an external surface of the side panel 12 of the motor vehicle 10.

The upper, lower and centre guide channels 48A, 48B and 40 are used to guide the door 20 during opening and closing and are conventional in design and location. It will also be appreciated that various mechanisms are known in the art for attaching a sliding door to guide channels. It will further be appreciated that FIGS. 1 and 2 do not necessarily show the size and positioning of the guide channels. One example of a guide channel arrangement for a sliding door can be found in PCT publication WO 2008/025827, which is hereby incorporated by reference in its entirety, but many other examples exist and the invention is not limited to use with a specific door guidance mechanism.

It will be appreciated that the guide arms and guide channels cooperate to guide the door not only forwardly and rearwardly but also to move the door outwardly from the door aperture when opening commences and inwardly at the end of a closing operation.

Referring now to FIGS. 3A to 4B a door actuation mechanism 100 is shown schematically.

Figure 3A:
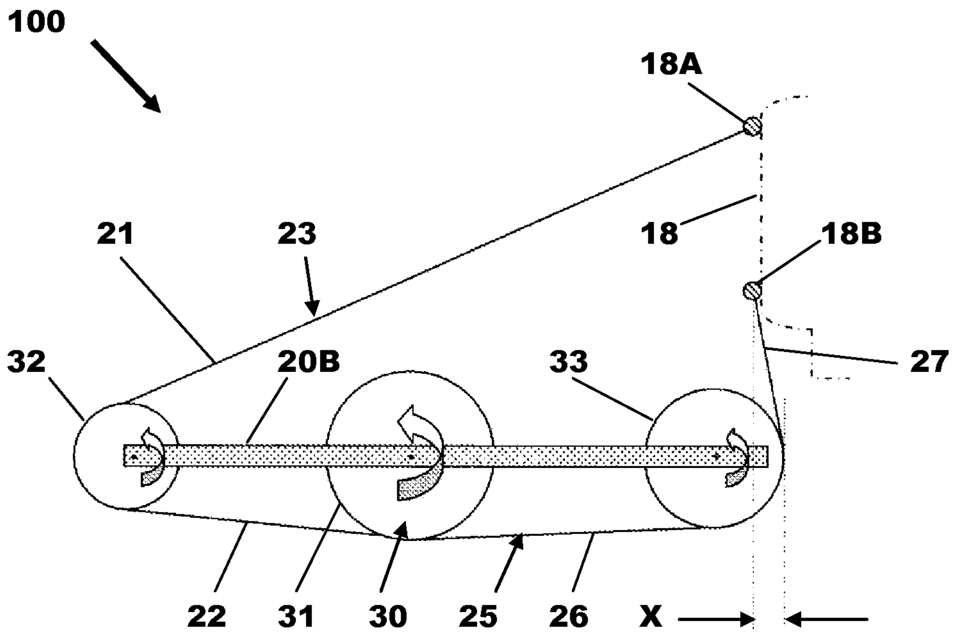
FIG. 3A is a schematic depiction of a door actuation mechanism according to a one embodiment of the present disclosure, when the door is in a closed position.
Figure 3B:
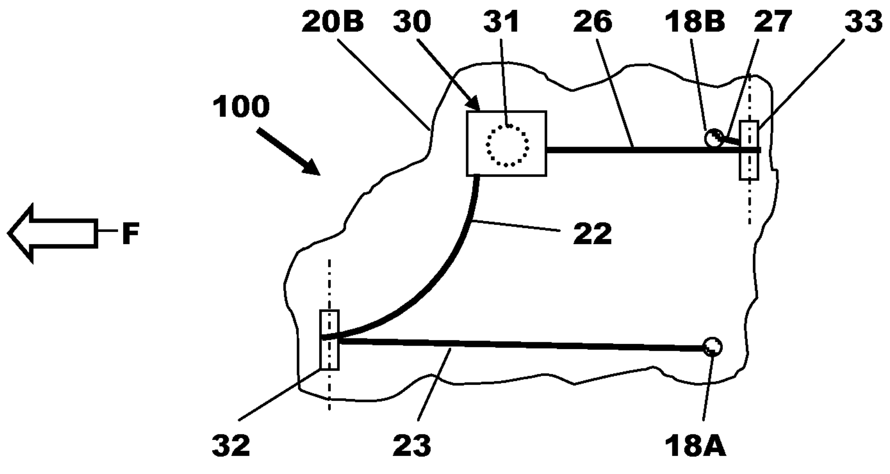
FIG. 3B is a schematic side view of the door actuation mechanism shown in FIG. 3A.
Figure 4A:
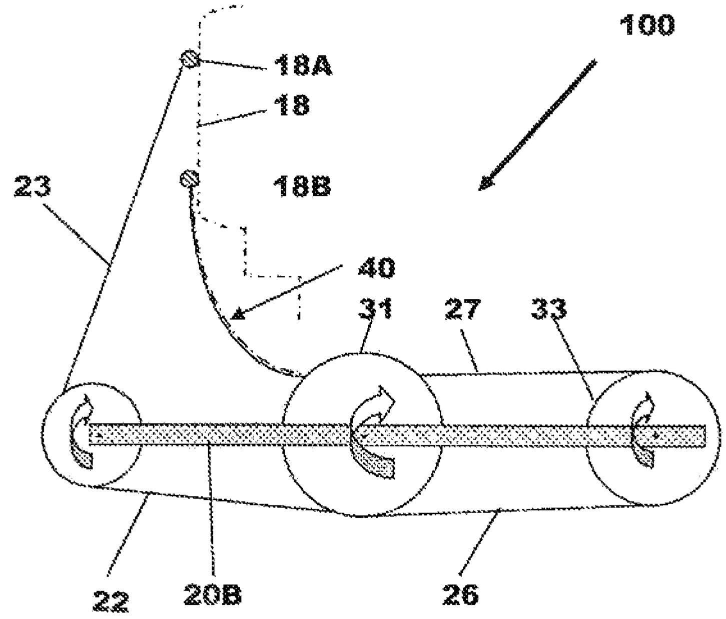
FIG. 4A is a schematic plan view of the door actuation mechanism shown in FIG. 3A when the door is in an open position.
Figure 4B:
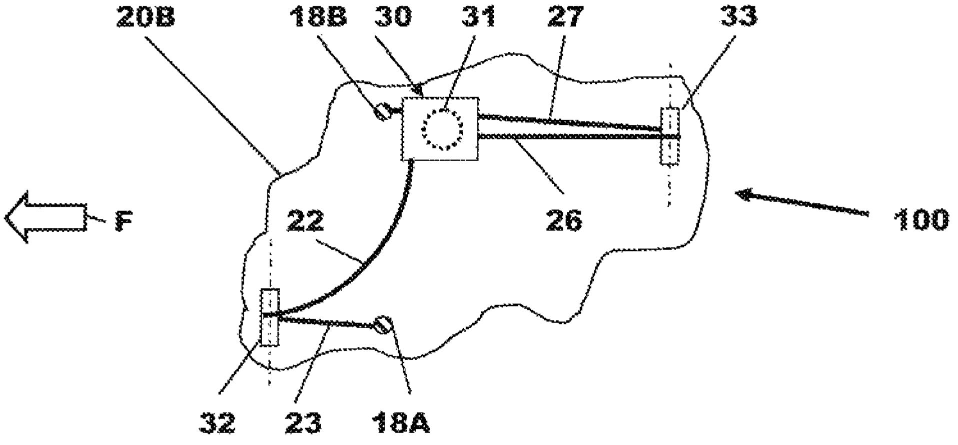
FIG. 4B is a schematic side view of the door mechanism shown in FIG. 4A.

The FIGS. 3A and 3B show the position of various components when the door 20 is in a closed position and the FIGS. 4A and 4B show the position of the same components when the door 20 is in an open position. The arrows 'F' on FIGS. 3B and 4B show the direction of the front of the motor vehicle 10 and so movement of the door in the direction of the arrows 'F' will be referred to herein as forward or forwardly and direction of the door in an opposite direction will be referred to as rearward or rearwardly.

The door 20 is conventional in design and comprises of an outer panel 20A and an inner panel 20B secured together to define a door cavity in which a door actuator 30 is mounted by in this case attachment to part of the inner door panel 20B. One example of such a door construction is shown in European Patent 2006134, which is hereby incorporated by reference in its entirety.

The door actuator 30 is driven by a motor 60 (not shown in FIGS. 3A to 4B) and is operatively connected to first and second actuation cables 23, 25. The first cable 23 is attached at one end to the door actuator 30 and is adapted for attachment at a second end to part of the body structure 11 of the motor vehicle 10 in the form of the 'C' post 18 by means of an anchor 18A so as to define a first cable run.

The first cable run comprises a portion 22 extending away from the door actuator 30 to a first cable guide in the form of a pulley 32 located near a front end of the door 20 and a portion 21 extending from the pulley 32 in the door opening direction for attachment to the anchor 18A.

The second cable 25 is attached at one end to the door actuator 30 and is adapted for attachment to the 'C' post at a second end by means of an anchor 18B so as to define a second cable run.

The second cable run comprises a portion 26 extending away from the door actuator 30 to a second cable guide in the form of a pulley 33 located near a rear end of the door 20 and a portion 27 extending from the pulley 33 in a door closing direction for attachment to the ‘C’ post by means of the anchor 18B.

One of the features of the invention is that the second portions 21, 27 of the first and second cables 23 and 25 always extend from their respective guides 32, 33 in the same direction as the direction of motion they cause to occur. That is to say, for a door that slides towards the rear of the motor vehicle 10, the portion 21 of the first cable 23 always extends rearwardly from the pulley 32 irrespective of the position of the door 20 and the second portion 27 of the second cable 25 always extends forwardly from the pulley 33 irrespective of the position of the door 20. On FIG. 3A the forward extension of the second portion 27 of the second cable 25 is shown as extending forward a distance ‘X’ from the position where it feeds off of the pulley 33. It will be appreciated that this distance ‘X’ can in practice be very small.

Figure 5:
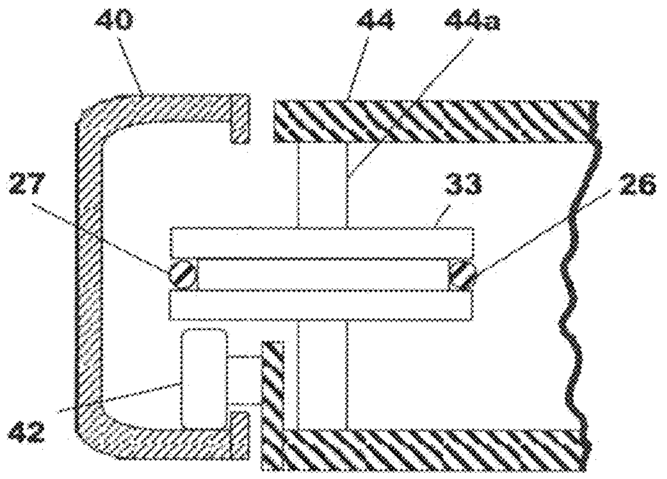
FIG. 5 is a partial cross-sectional view through a guide arm attached the sliding door of FIG. 1.

For simplicity of illustration the first guide in the form of the pulley 32 and the second guide in the form of the pulley 33 are both shown as being rotatably attached to the inner door panel 20B but can be attached to guide arms 46, 44 (see FIGS. 5 and 6) connected to the inner door panel 20B.

In FIGS. 3A and 4A the door actuator 30 is shown having a spool 31 for the two cables 23, 25 arranged vertically and in FIGS. 3B and 4B the same spool 31 is shown horizontally arranged, this difference illustrates that the orientation of the spool 31 can be in either of these directions and that this embodiment is not limited to a specific spool orientation. In practice and as referred to later two separate but synchronized spools may be used instead of a single spool 31. Similarly, although the two pulleys 32, 33 are shown to be rotatable about vertical axes, this need not be the case and horizontal axes of rotation could be used. Furthermore, the first and second guides need not be in the form of pulleys, low friction U-shaped fixed guides could be used but pulleys have lower resistance to motion.

Figure 7:
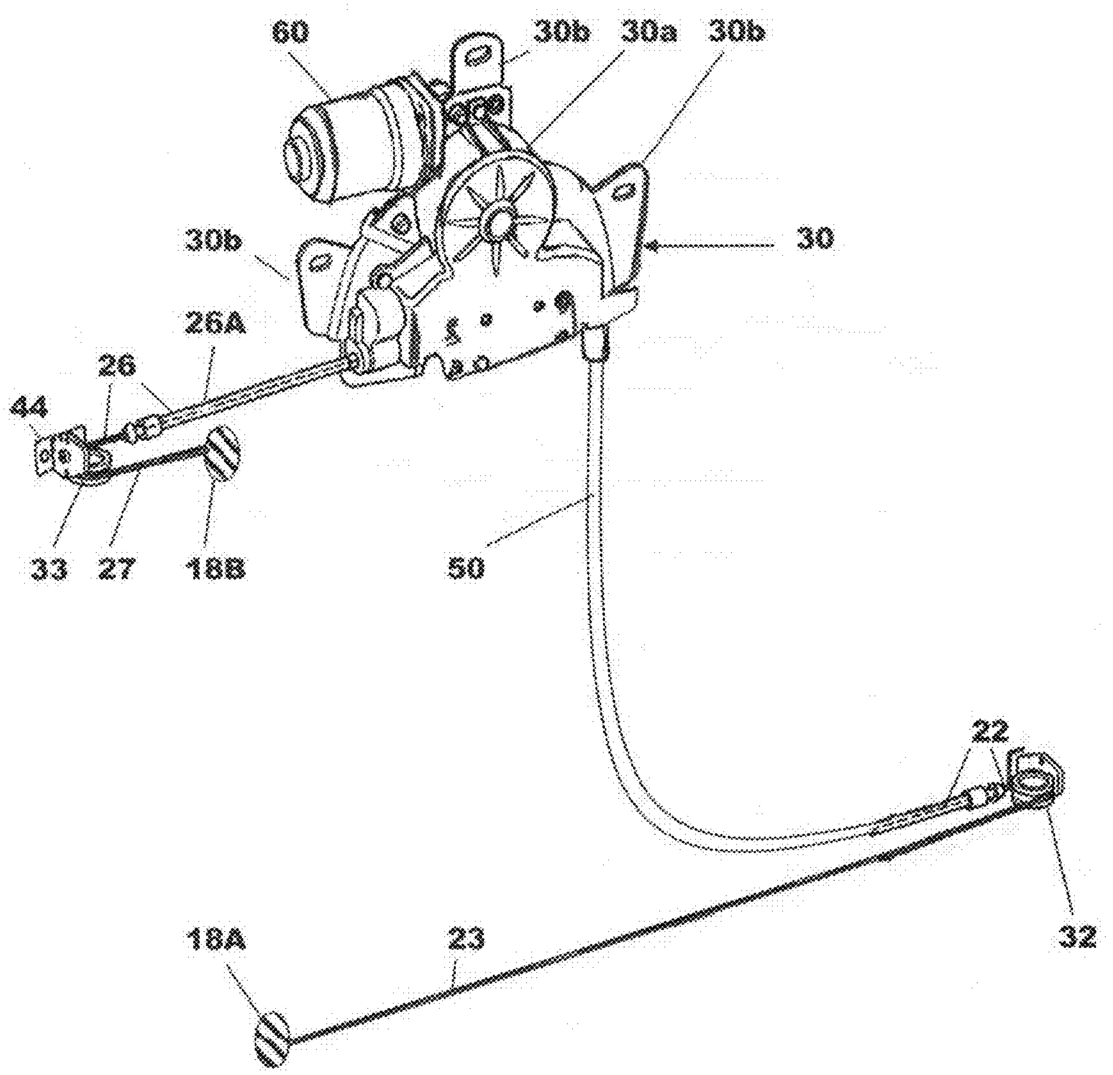
FIG. 7 is a perspective view of the door actuation mechanism of FIGS. 4A-B.

Referring now to FIG. 7, which shows one embodiment of the present disclosure when the door 20 is in a fully closed position, the door actuator 30 is driven by the motor 60 and includes a housing 30*a* including brackets 30*b* to mount the door actuator 30 to the inner door panel 20B.

The first cable 23 extends away from the actuator housing 30*a* and is slidingly located in a rigid tube 50 that is bent to a desired shape which, in use, guides the path of the first cable 23 for a significant part of the portion 22 of its run from the door actuator 30 to the front guide into the form of the pulley 32. The tube 50 in this case is a steel tube having a bore coated with a low friction material such as P.T.F.E but it will be appreciated that other materials could be used for the tube 50 and the coating. The use of such a tube has advantages such as the first cable 23 being routed from the door actuator 30 which is mounted up in the door cavity to the bottom of the door without requiring the use of a complex pulley system or secondly, that portion 22 of the first cable 23 is protected for much of it run within the door cavity.

Portion 26 of the second cable run is also in this case protected by a protective sleeve 26A so that the second cable 25 takes the form of a Bowden cable up to the second guide formed by the pulley 33. The second guide in the form of the pulley 33 is connected to the door structure via a centre guide arm 44 shown in more detail in FIG. 5.

The centre guide arm 44 is attached at one end to the door 20 for guiding the door 20 during opening and closing of the door by means of a roller 42. The second cable guide in the form of the pulley 33 is rotatable attached near a free end of the centre guide arm 44 by means of a spindle 44*a*. The pulley 33 is attached to the centre guide arm 44 so as to project into the centre guide channel 40 which is attached to the external surface of the side panel 12 of the motor vehicle 10.

When the door 20 is moved from its closed position towards the open position the second portion 27 of the second cable run is fed out into the centre guide channel 40 so that the second portion 27 of the second cable run lies within the centre guide channel 40. However, when the door 20 is moved to the closed position the second portion 27 moves with the pulley 33 and the door 20 so that the centre guide channel 40 is left empty when the door 20 is in the closed position. Therefore, irrespective of whether the door 20 is open or closed, the second cable run is concealed from view by the door 20.

Figure 6:
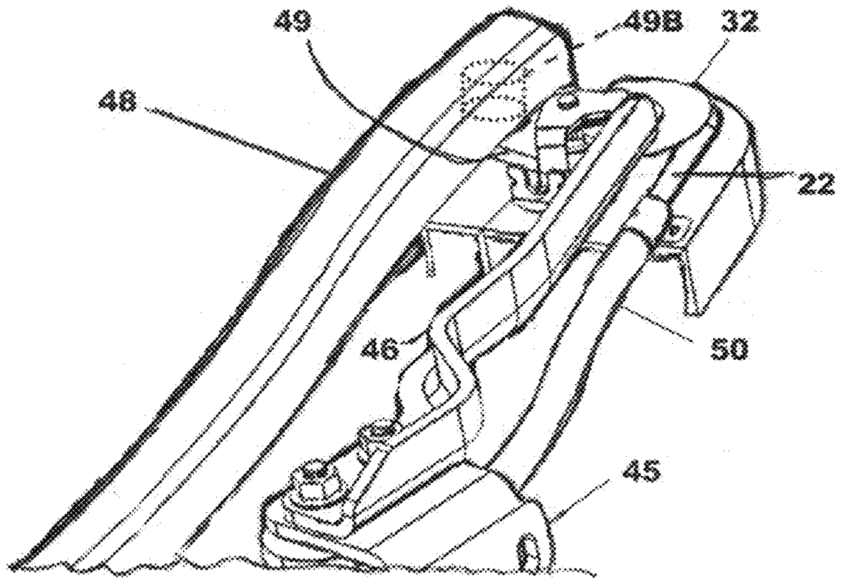
FIG. 6 is a perspective view of the guide arm of FIG. 5 in a closed position.

Referring now to FIG. 6 there is shown one embodiment of a first or lower guide arm 46. The lower guide arm 46 is attached at one end by means of a bracket 45 to a bottom end of the door 20 for guiding the door 20 during opening and closing. The guide arm 46 includes a guide plate 49 on which a guide roller 49B (shown as a dotted outline on FIG. 6) is rotatably mounted and the pulley 32 is rotatably attached near to free end of the first guide arm 46.

The guide roller 49B is engaged with the lower guide channel 48B so as to guide and support the bottom end of the door 20.

Figure 8:
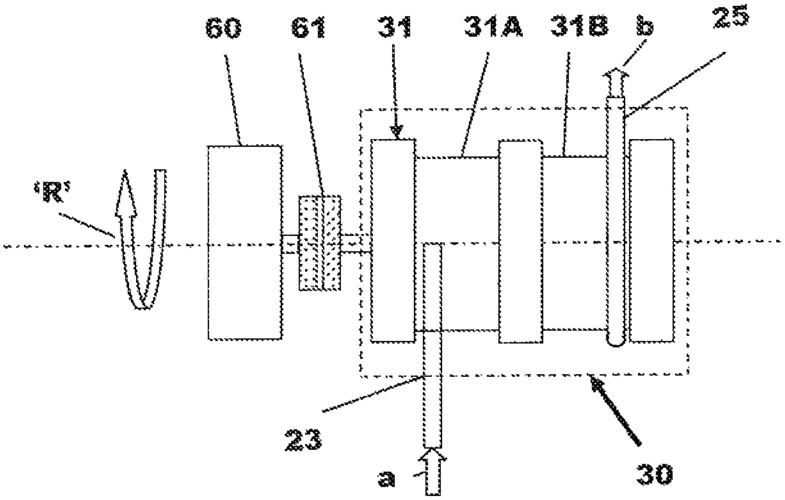
FIG. 8 is a cross-sectional view of a door actuator and motor of FIG. 7.

With reference to FIG. 8 there is shown in a schematic form the door actuator 30 and the drive motor 60 for the door actuator 30.

The motor 60 drives the door actuator 30 via a clutch 61. The clutch 61 is overcome when a predefined torque is applied to it from the door actuator 30 thereby allowing the door 20 to be manually opened and closed.

The door actuator 30 comprises first and second drive spools 31A and 31B driven by the motor 60. One end of the first portion 22 of the first cable 23 is attached to the first drive spool 31A and one end of the first portion 26 of the second cable 25 is attached to the second drive spool 31B. In the example shown, the first and second drive spools 31A and 31B are formed as a single combined drive spool but this need not be the case; separate synchronised spools can be used.

The first cable 23 is wound round the first spool 31A in the opposite direction to the direction the second cable 25 is wound in. In the example shown, when viewed from the motor 60 end, the first cable 23 is wound around the first spool 31A in a clockwise direction and the second cable 25 is wound around the second spool 31B in an anti-clockwise or counter-clockwise direction. Given the cable layout shown in FIGS. 3A to 4B, rotation of the motor 60 in a first or anti-clock wise direction, as shown by the arrow ‘R’ on FIG. 8, causes the first cable 23 to be retracted into the door actuator 30 as indicated by the arrow ‘a’ and the second cable 25 to be reeled out as indicated by the arrow ‘b’ from the door actuator 30 so as to open the door 20.

Similarly, rotation of the motor in a second or clockwise direction causes the second cable 25 to be retracted into the door actuator 30 and the first cable 23 to be reeled out from the door actuator 30 so as to close the door 20.

It will be appreciated that the door 20 will also be provided with various locks and latches but these are of a conventional construction and so are not shown or described.

Operation of the door actuating mechanism in use is occupant controlled by means of a switch or switches. When the door 20 is required to be opened an occupant operates the appropriate switch causing the motor 60 to rotate in the door opening direction thereby retracting the first cable 23 which pulls the door 20 rearwards thereby opening it. When the door 20 is to be closed, an occupant operates the appropriate switch causing the motor 60 to rotate in a door closing direction thereby retracting the second cable 25 and pulling the door 20 forwardly into the closed position. It will be appreciated that anti-trap or anti-pinch devices will be fitted to the front end of the door 20 to prevent injury should a foreign object become interposed between the closing door 20 and the ‘B’ post 17 and that overload protection will be provided for the motor 60.

Although the invention has been shown and described with respect to an arrangement in which the door opening cable is located near a bottom end of the door it will be appreciated that the door opening cable could be located near a top end of the door provide. If, for example, the motor vehicle is a panel van or light truck the door opening cable could be located at the top or bottom of the door.

Similarly, although the invention has been shown and described with respect to an arrangement in which the door closing cable is located in the centre of the door, it will be appreciated that the door closing cable could be located near a top or bottom end of the door provided an external body mounted door guide channel is located in that position. For example, if the motor vehicle is a panel van or light truck the door closing cable could be located in the centre of the door, at the top of the door or at the bottom of the door.

The disclosed arrangement for the opening and closing cables is preferred due to ease of packaging and the fact that a window may be provided in the upper half of the door. It will also be appreciated that the motor vehicle 10 could have a sliding door fitted with a door actuating mechanism on both sides or on only one side of the vehicle.

Although in most cases the door will be required to slide rearward to open, those skilled in the art will appreciate that the door can be arranged to open by sliding in a forward direction and that in this case the mechanism can be a mirror image of that shown in FIGS. 3A to 4B with the first and second cables being attached via anchors to the ‘B’ post and not the ‘C’ post.

It will also be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A door actuation mechanism for a sliding door of a motor vehicle having a body structure comprising:

a motor configured to drive a door actuator;

a first cable having a first and second end, the first end attached to the door actuator and adapted for attachment of the second end to the body structure so as to define a first cable run, wherein the first cable is configured to move the door in a door opening direction wherein the first cable run includes a first portion extending away from the door actuator to a first cable guide located near a first end of the door, wherein the first cable guide is located near to a bottom end of the door, wherein the first cable is guided for at least part of the first portion of the first cable run by a rigid tube having a bore coated in a low friction material, a second portion extending from the first guide, in the door opening direction, for attachment to the body structure of the motor vehicle; and a second cable having a third and fourth end, the third end attached to the door actuator and adapted for attachment of the fourth end to the body structure so as to define a second cable run, wherein the second cable is configured to move the door in a door closing direction;

wherein a portion of each cable run runs in a direction in which the door mechanism moves the sliding door, wherein the door is a rearward opening door and wherein the first cable guide is located near a front end of the door.

2. The mechanism of claim 1, wherein the second cable run comprises:

a first portion extending away from the door actuator a second cable guide located near a second end of the door; and a second portion extending from the second guide, in the door closing direction, for attachment to the body structure.

3. The mechanism of claim 1, wherein the door is a rearwardly opening door, and wherein the second cable guide is located near a rear end of the door.

4. The mechanism of claim 1, wherein the mechanism is configured so that rotation of the motor in a first direction causes the first cable to retract into the door actuator and the second cable to reel out from the door actuator, so as to open the door and wherein the mechanism is configured so that rotation of the motor in a second direction causes the second cable to retract into the door actuator and the first cable to reel out from the door actuator, so as to close the door.

5. A motor vehicle having a C-pillar with an automated sliding door, comprising:

a door defining a door cavity; and a motor-driven door actuator located within the door cavity, wherein the actuator includes:

a first drive spool linked to the C-pillar through a first cable, configured to pull the door in an opening direction; and a second drive spool linked to the C-pillar through a second cable, configured to pull the door in a closing direction.

6. The vehicle of claim 5, comprising:

a first guide between the first drive spool and the C-pillar configured to guide the first cable.

7. The vehicle of claim 6, comprising:

a second guide between the second drive spool and the C-pillar configured to guide the second cable.

8. The vehicle of claim 7, comprising:

a guide channel extending from any one of the first guide or the second guide and at least partially covering the first or second cable extending between the first guide or the second guide, respectively, and the C-pillar.

9. An automated sliding door for a motor vehicle including a body structure adjacent one side of the door, comprising:

a door cavity; and a motor-driven door actuator located within the door cavity, wherein the actuator includes:

a two-sided drive spool with a first drive spool configured to link to the body structure through a first cable and a second drive spool configured to link to the body structure trough a second cable and a first pulley configured to translate extension of the first cable from the first drive spool into a door opening direction.

10. The sliding door of claim 9, further comprising:

a second pulley configured to translate extension of the second cable from the second drive spool into door closing direction.

11. The sliding door of claim 10, further comprising:

a guide arm attaching the first or second pulley to the door.

12. The sliding door of claim 11, further comprising:

a guide channel extending from any one of the first pulley or the second pulley and at least partially covering the first or second cable extending between the first pulley or the second pulley, respectively, and the body structure.

13. The sliding door of claim 9, wherein the body structure is a C-pillar.

* * * * *